Aug. 29, 1961    J. R. HUBER    2,998,225
ADJUSTABLE SECURING DEVICE
Filed April 4, 1958    2 Sheets-Sheet 1
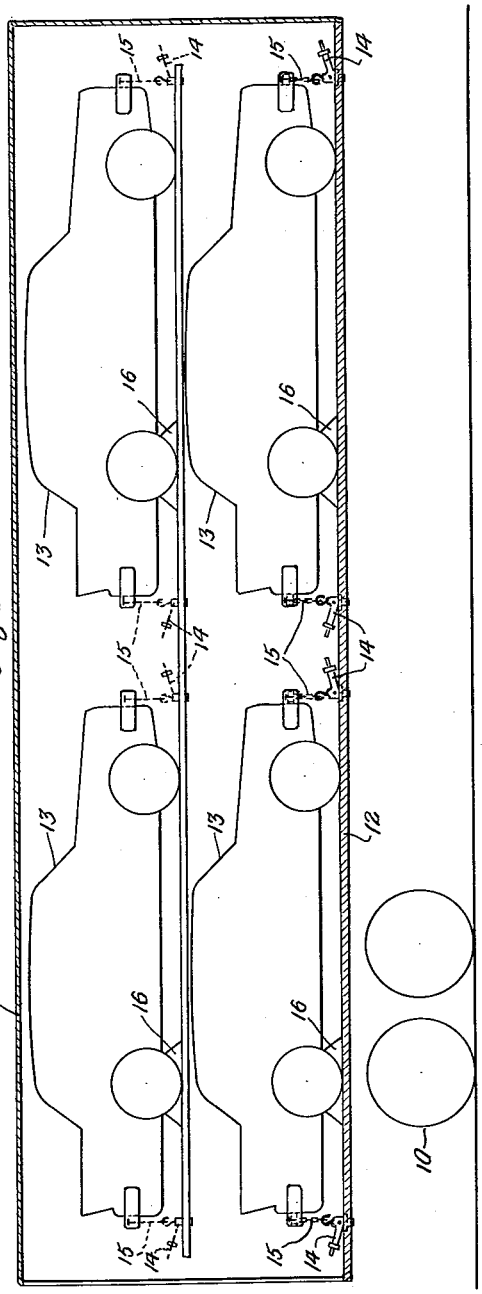
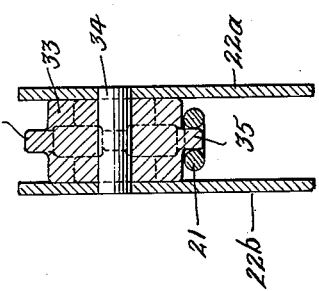
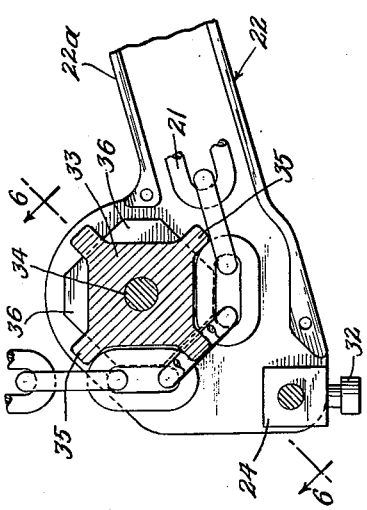
INVENTOR
John Richard Huber
BY Harris S. Campbell
ATTORNEY Aug. 29, 1961     J. R. HUBER     2,998,225
ADJUSTABLE SECURING DEVICE
Filed April 4, 1958     2 Sheets-Sheet 2
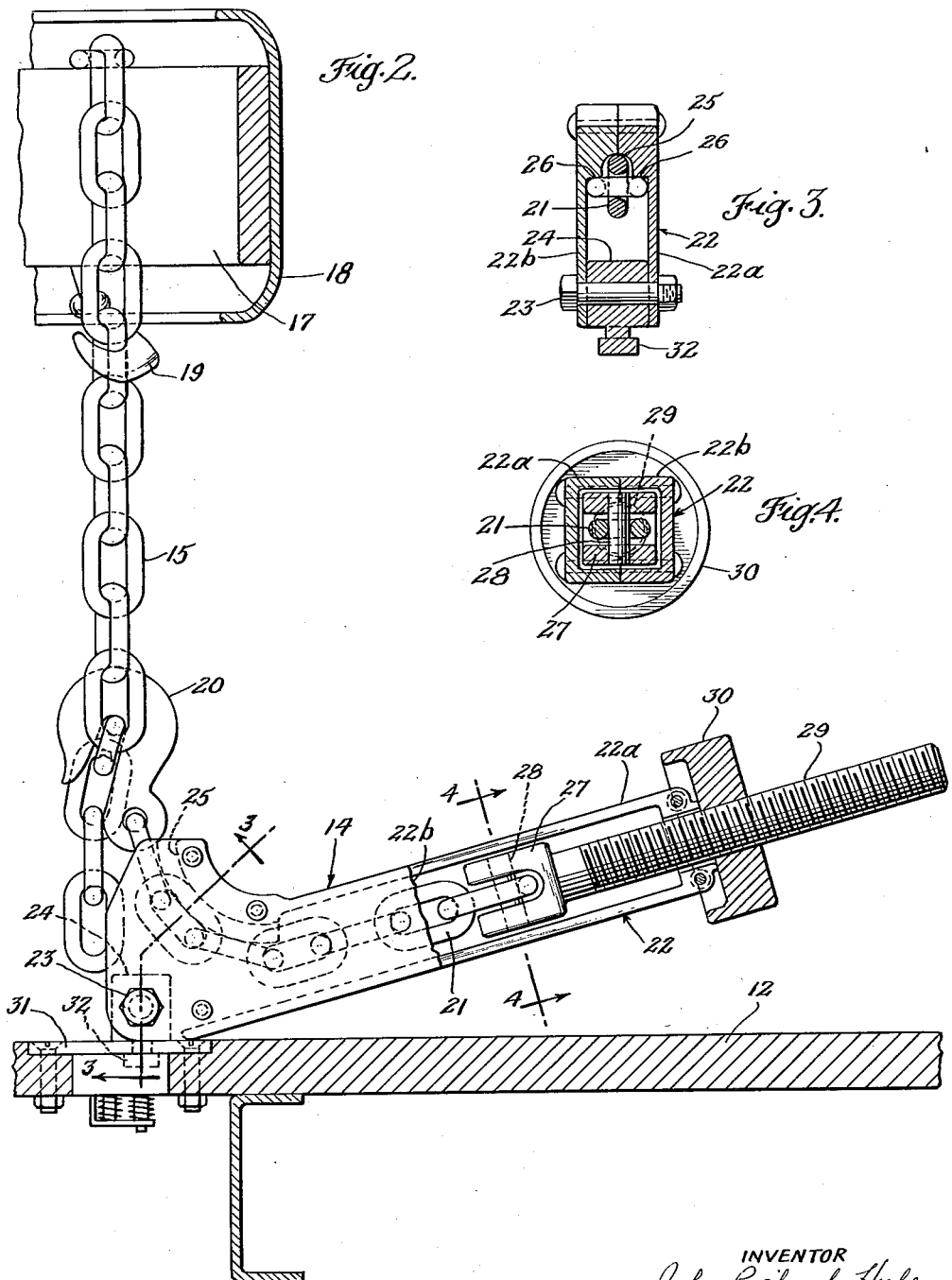
INVENTOR
John Richard Huber
BY Harris S. Campbell
ATTORNEY United States Patent Office 2,998,225
Patented Aug. 29, 1961

2,998,225
ADJUSTABLE SECURING DEVICE
John Richard Huber, Holicong, Pa., assignor to Eastern Rotorcraft Corporation, Doylestown, Pa., a corporation of Pennsylvania
Filed Apr. 4, 1958, Ser. No. 726,453
1 Claim. (Cl. 254—67)

This invention relates to adjustable securing devices suitable for holding cargo in place while being transported.

Tie down devices of the present type are sometimes used to secure vehicles, such as automobiles and trucks, in a carrier vehicle during shipment. It is customary to secure such vehicles by means of a hold-down device attached to the bumpers or frame. The distance between the frame and the floor where the anchor point is located is limited. The device must provide for considerable adjustment length in order to draw the vehicle down snugly against the flexibility and the deflection permitted by the springs and the tires. It is a primary object of the present invention to provide an adjustable securing device having a mechanism which may be used in relatively inaccessible places while still allowing a relatively long adjustment. The adjustable mechanism of the present device is disposed in a direction approximately transverse to the direction of the tension securing member and extends in a fashion which permits it to be easily reached for manual operation even though the tension portion of the device attached to the cargo may be located underneath the article being secured in a somewhat inaccessible position.

Another object of the invention is the provision of an adjustable device incorporating a piece of chain to carry the adjustment movement out of the device to the load connection, the end of the chain incorporating a connector for engaging another tension member at selected locations.

How the objects and advantages of the present invention are accomplished will be clear from the following description of the drawings in which:

FIGURE 1 illustrates a transport vehicle showing the manner in which the tie down devices of the present invention may be applied.

FIGURE 2 is an elevational view of the device with parts shown in section, illustrating the mechanism as applied to secure a vehicle.

FIGURE 3 is a sectional view taken in the direction of arrows 3—3, FIGURE 2, showing the construction of the device at the floor anchoring point.

FIGURE 4 is a sectional view taken in the direction of arrows 4—4, FIGURE 2.

FIGURE 5 is a view of a portion of the mechanism showing an alternate construction for guiding the chain element.

FIGURE 6 is a sectional view taken in the direction of arrows 6—6, FIGURE 5.

Referring to the figures it will be seen that FIGURE 1 illustrates diagrammatically a transport vehicle having rear wheels 10, a body 11 and a floor 12. Automobiles 13 are shown in position with securing devices 14 and tension members 15. If desired blocks 16 may be used to prevent motions of the wheels.

The details of construction of the tie down device 14 will be more clearly observed in FIGURES 2, 3 and 4. The chain 15 is shown looped over the frame extension 17 which supports the bumper 18. A grab hook 19 is used to complete the loop of chain around the bumper and the chain 15 hangs downwardly and is engaged by another grab hook 20 which is connected to a short length of chain 21 associated with the adjustment mechanism. The adjusting device 14 incorporates a frame 22 having two parts 22a and 22b which are joined together in suitable fashion to form a square section housing as will be clearly seen in FIGURE 4. The end of the frame 22 from which chain 21 emerges is open and at each sidewall an aperture is provided to support a bolt 23 in a fashion to form a pivotal mount for the anchor block 24. In the upper corner of the end of the frame 22 from which the chain 21 emerges the housing is shaped to accommodate the chain links and hold them in correct position. This shape is clearly seen in FIGURE 3 where a groove 25 is formed to guide those links which are in vertical or edgewise position and abutments 26 are formed to support the links which lie in flat position. The end of chain 21 opposite from the grab hook 20 is connected to a fork terminal 27 by means of pin 28. Attached to the fork terminal 27 is a threaded rod 29 which extends out of the end of the frame 22. A hand wheel 30 is provided with a female thread to fit the thread of rod 29 to provide for movement with respect to the frame 22.

In order to anchor the frame 22 floor fittings 31 are bolted to the floor 12 at convenient positions. Floor fitting 31 incorporates a suitable aperture and slot to engage the headed terminal 32 which is attached to the anchor block 24. Suitable retention means are incorporated in the floor fitting 31 to prevent inadvertent removal of the terminal member 32. The position of anchor block 24 with respect to the direction of load application in chain member 21 is such that the frame 22 lies in a position generally transverse to the application of the tension load but at a somewhat upwardly inclined angle.

In FIGURES 5 and 6 a slightly different arrangement of the chain guiding mechanism is illustrated. Instead of the groove and abutments for guiding the chain as illustrated in FIGURES 2 and 3 a sprocket member 33 is supported in the end of the frame 22 for rotation on the axle member 34. The sprocket member 33 is equipped with projections 35 which extend into the flatly disposed links and sideplates 36 which form pockets for guiding and supporting the links which lie in edgewise relationship.

To secure a piece of cargo such as a vehicle the loose piece of chain 15 is passed around a suitable portion of the structure such as frame projection 17 and the grab hook 19 engaged to a link to anchor the upper end of the chain in position. With the hand wheel 30 screwed back close to the end of the threaded rod 29 the chain 21 is drawn out from the frame 22 as far as possible to give the maximum adjustment. With the frame 22 anchored to the nearest convenient floor fitting 31 by means of the headed terminal 32 the grab hook 20 is then extended to engage a suitable link in chain 15. Tightening of the chain 15 is then accomplished by rotating the hand wheel 30 in a direction to draw the chain 21 into the frame 22 thus removing the slack and applying tension to the securing chain.

As tightening is accomplished chain 21 is guided around the curved portion of the frame incorporating the groove 25 and abutments 26. With the form of chain guide shown in FIGURE 5, as the chain 21 is drawn into the frame 22 under the action of the tightening adjustment, the sprocket 33 rotates and maintains the chain 21 in properly aligned position. It will be noted that the generally square cross-sectional shape of the fork terminal 27 fits fairly snugly within the square section frame 22 and thus prevents rotation of the rod 29 when the hand wheel 30 is rotated during adjustment.

With the mechanism disclosed an extremely compact adjustment device is produced. Since the adjustment mechanism is disposed at an angle to the direction of application of load in the tension member, effective adjustment can be obtained even when the distance between the anchor point and the point of attachment to the cargo is relatively small. The compact headed stud device for connecting into a floor fitting at substantially floor level permits more space for adjustment as compared to the usual connection to the anchor point involving a floor ring and a hook. The guide devices for engaging the chain associated with the adjustment mechanism are located at the correct position in relation to the anchor stud to cause the frame 22 to extend at the desired angle for convenient operation. This generally transverse direction of the adjustment mechanism further permits the location of tie down tension member at a point where it may be some distance under, for example, the vehicle being tied down. With the transversely extending adjustment frame the mechanism may be still conveniently reached for the adjusting operation. With the two piece chain arrangement in which one portion of the chain is attached to the article or vehicle being secured further versatility of operation results. Thus in crowded locations the securing chain may be attached to the vehicle before it is moved into loaded position where space may be at a premium. Likewise for removal the adjustment may be released to separate the chains and the vehicle then moved to a location where removal of the chain is more readily accomplished.

I claim:

An adjustable securing and tensioning device having an elongated frame, an anchor member having a pivot connecting it to said frame near one end thereof, a threaded rod member in axial alignment with said frame and having one end located inside said frame and the other extending out of said frame at the end opposite said anchor member, a manually rotatable nut element engaging the threads of said rod and reacting against the end of said frame, a chain having a length slightly greater than said frame connected to the end of said rod member and having a grab hook at the other end for engaging a chain link, a guide member for said chain attached to said frame near the end having said anchor member, said guide member having a curved shape positioned so that a portion of said chain lying within said frame is aligned with said threaded rod member, said guide member having a chain groove therein, the anchor member pivot being located at the side of the frame opposite said guide member and at a point further from the end of the frame against which the nut element reacts than said guide member, the anchor member pivot location serving to hold said frame at an included angle slightly less than 90 degrees with respect to the line of a tension member engaging said grab hook thereby supporting said frame at a position close to and above a surface to which the anchor member may be attached when the tension is applied substantially perpendicular to such a surface.

References Cited in the file of this patent

UNITED STATES PATENTS

| | | |
|---|---|---|
| 721,946 | Foster | Mar. 3, 1903 |
| 2,247,642 | Neville | July 1, 1941 |
| 2,627,637 | Downing | Feb. 10, 1953 |
| 2,715,012 | Huber | Aug. 9, 1955 |
| 2,820,540 | Klinzing | Jan. 21, 1958 |